United States Patent [19]
Baker

[11] 3,841,095
[45] Oct. 15, 1974

[54] MOTOR VEHICLE FLUID POWER CIRCUIT
[75] Inventor: James P. Baker, Parma Heights, Ohio
[73] Assignee: The Weatherhead Company, Cleveland, Ohio
[22] Filed: Apr. 26, 1973
[21] Appl. No.: 354,710

[52] U.S. Cl................. 60/404, 60/422, 91/412, 137/101, 60/413
[51] Int. Cl..................... F15b 11/16, F15b 1/02
[58] Field of Search ............ 60/404, 405, 420, 422, 60/428, 484, 413; 91/412; 137/101, 115

[56] References Cited
UNITED STATES PATENTS

| | | | |
|---|---|---|---|
| 2,674,092 | 4/1954 | Gardiner | 60/422 X |
| 2,793,498 | 5/1957 | Banker | 137/115 |
| 2,846,850 | 8/1958 | Hall | 91/412 |
| 3,165,113 | 1/1965 | Schultz | 137/101 |
| 3,170,536 | 2/1965 | VanHouse et al. | 60/404 |

Primary Examiner—Edgar W. Geoghegan
Attorney, Agent, or Firm—McNenny, Farrington, Pearne & Gordon

[57] ABSTRACT

A motor vehicle fluid power circuit is disclosed which includes a constant displacement pump driven by the engine of the vehicle, a flow divider, a control valve, an open center steering valve, a brake booster accumulator, and a brake booster. The entire output of the pump flows to the flow divider under all conditions, and 20 percent of the pump output is directed to the brake booster for open center operation of the brake booster under normal operating conditions while the remaining 80 percent of the pump output is directed to the control valve. The control valve selectively directs the fluid which it receives to the steering valve to assist in steering the vehicle or to the brake booster accumulator. The accumulator provides a reserve of high pressure fluid for closed center operation of the brake booster under emergency conditions.

25 Claims, No Drawings

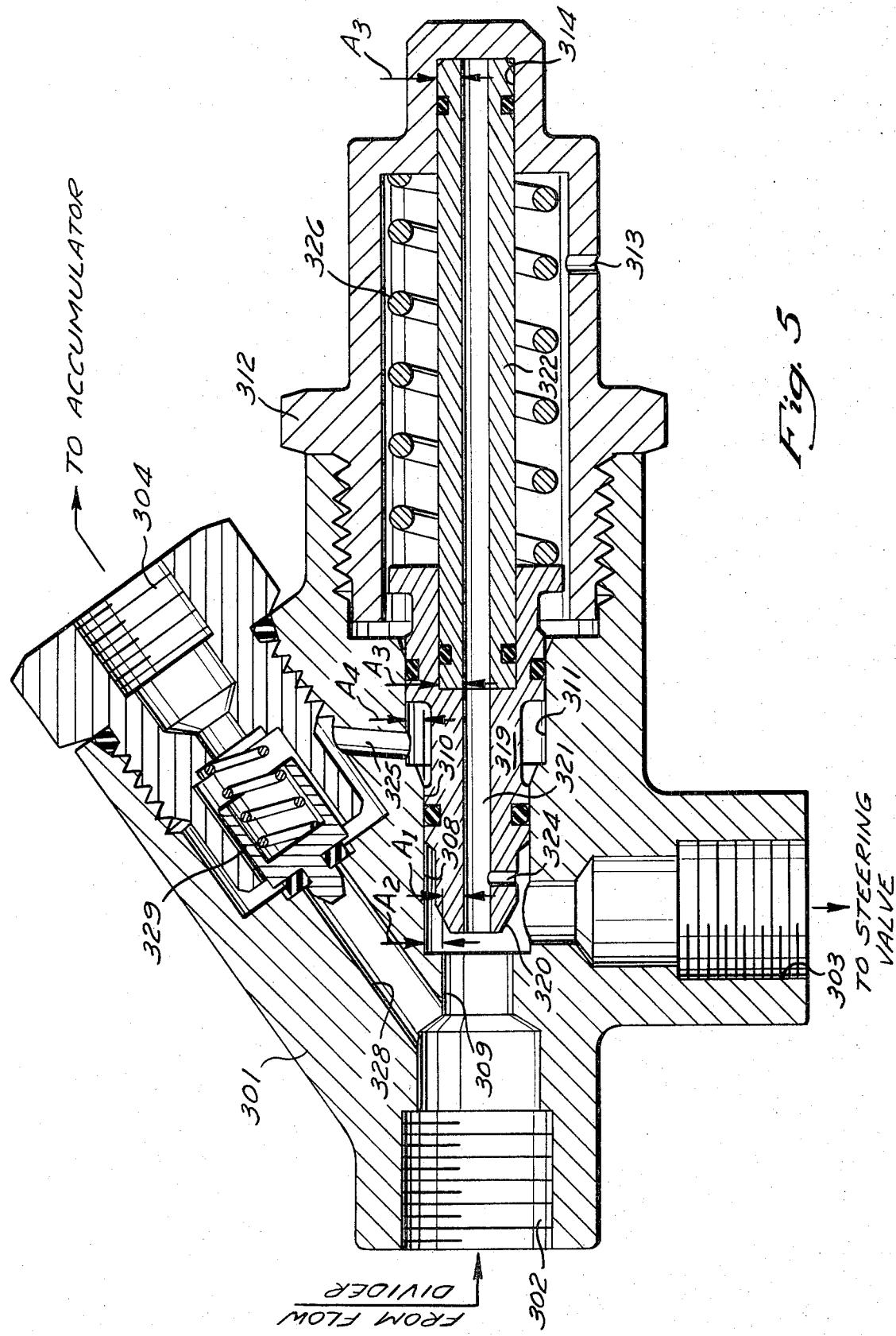

MOTOR VEHICLE FLUID POWER CIRCUIT

BACKGROUND OF THE INVENTION

This invention relates generally to a hydraulic fluid power circuit, and more particularly to a motor vehicle hydraulic fluid power circuit having a hydraulic pump for supplying fluid to assist the operator in steering and braking the vehicle.

Motor vehicles are frequently provided with a hydraulic pump which is driven by the engine of the vehicle to provide a source of fluid power. In passenger cars, this fluid power is frequently used to assist the operator in steering the vehicle. Because the magnitude of the intake manifold vacuum is decreasing in modern cars, vacuum boosters for assisting the operator in braking the vehicle may not provide a satisfactory source of power. For this and other reasons, it has been suggested to use the fluid power of the engine driven hydraulic pump to assist the operator in braking the vehicle as well as assisting the operator in steering the vehicle.

CROSS-REFERENCE TO RELATED APPLICATION

Reference is made to the copending U.S. Pat. application of Frederick D. Keady, Ser. No. 353,248 filed Apr. 23, 1973 and assigned to the assignee of this application.

SUMMARY OF THE INVENTION

The present invention provides a motor vehicle fluid power circuit which includes a constant displacement pump, a flow divider, a brake booster, a control valve, a steering valve, and an accumulator. The entire output of the pump is directed to the flow divider, and the flow divider directs a predetermined portion of the pump output to the brake booster for open center operation of the brake booster under normal conditions, and the remainder of the pump output to the control valve. The control valve selectively directs the portion of the pump output which it receives to the steering valve or to the accumulator. The accumulator provides a reserve of high pressure fluid for closed center operation of the brake booster under emergency conditions.

The brake booster which is provided by the present invention includes an input rod movable toward and away from a deactuated position, a power piston slidably disposed in a bore, a fluid power chamber on one side of the power piston adjacent the input rod, and an output rod on the other side of the power piston. A pump inlet port receives fluid from the pump and is in open fluid pressure communication with the fluid power chamber. A first valve means is movable by the input rod for opening and at least partially closing fluid pressure communication between the pump inlet port and an outlet port through the fluid power chamber to increase and decrease the fluid pressure in the fluid power chamber. The first valve means is open when the input rod is in its deactuated position, so that open fluid pressure communication is maintained between the pump inlet port and the outlet port through the fluid power chamber for open center operation of the brake booster under normal conditions.

The brake booster also includes an accumulator inlet port which receives fluid from the accumulator. A second valve means is actuated by the input rod for opening fluid pressure communication between the accumulator inlet port and the fluid power chamber only when the first valve means is completely closed to isolate the fluid power chamber from the outlet port. The second valve means is spring biased to a normally closed position when the input rod is deactuated, so that the accumulator inlet port is normally isolated from the fluid power chamber to provide a closed center reserve capacity circuit for closed center operation of the brake booster under emergency conditions.

The first embodiment of the control valve provided by the present invention includes a housing having an inlet port for receiving fluid from the flow divider, a steering valve outlet port for supplying fluid to the steering valve, and an accumulator outlet port for supplying fluid to the accumulator. A first passage hydraulically connects the inlet port to the steering valve outlet port, and a second passage hydraulically connects the inlet port to the accumulator outlet port.

A loading spool is movable between an open position for opening the first passage leading to the steering valve and a closed position for closing the first passage to load the pump when the accumulator is being charged, and a spring biases the first spool to the closed position to so load the pump. An unloading spool cooperates with the loading spool and is movable between a rest position and an actuated position to move the loading spool to its open position to unload the pump when the accumulator is fully charged.

The unloading spool includes a first portion exposed to fluid inlet port pressure and a second portion of greater lateral cross-sectional area than the first portion exposed to accumulator pressure so that the unloading spool is movable from the rest position to the actuated position to move the loading spool to the open position to unload the pump when a predetermined pressure is applied to the first and second portions of the unloading spool. In this manner the unloading spool holds the loading spool in the open position to direct the fluid to the steering valve when the accumulator is fully charged.

The loading spool includes a net effective lateral cross-sectional area exposed to pressure in the steering valve outlet port when the loading spool is in the closed position. In this manner, when the unloading spool is in the rest position (which occurs when the accumulator is below its minimum charge level) so that the unloading spool is ineffective to hold the loading spool open and the loading spool closes the first passage leading to the steering valve, the control valve provides priority to the steering valve because an increase in the pressure in the steering valve outlet port acts on such net effective lateral cross-sectional area and moves the loading spool to the open position to open the first passage leading to the steering valve outlet port.

A second preferred embodiment of the control valve which is provided by the present invention includes a housing having an inlet port for receiving fluid from the pump, a steering valve outlet port for supplying fluid to the steering valve, and an accumulator outlet port for supplying fluid to the accumulator. A first passage hydraulically connects the inlet port to the steering valve outlet port, and a second passage hydraulically connects the inlet port to the accumulator outlet port. A spool is movable in the housing between an open position for opening the first passage and a closed position for closing the first passage, and the spool has first and second opposite end portions.

A predetermined area of the first end of the spool is exposed to fluid pressure in the inlet port, and a passage extends from the first end of the spool axially through the spool to the second end of the spool. A predetermined area of the second end of the spool is in open fluid pressure communication with the pressure in the inlet port through the axial passage, and the predetermined area of the second end of the spool is greater than the predetermined area of the first end of the spool. In this manner there is a net force of the inlet port pressure acting on the spool and urging the spool to the closed position so that this net force is decreased when the inlet port pressure is decreased to open the spool quickly when the spool begins to move from the closed position to the open position. The spool also includes a net effective lateral cross-sectional area exposed to accumulator outlet port pressure to open the first passage when the accumulator is fully charged and a net effective lateral cross-sectional area exposed to steering valve outlet port pressure to open the first passage when a steering maneuver is commenced even if the accummulator charge is depleted to give priority to the steering valve outlet port over the accumulator outlet port.

BRIEF DESCRIPTION OF THE DRAWINGS

These and other aspects, principles and advantages of the present invention are incorporated in the embodiments of the invention shown in the drawings, wherein:

FIG. 5 is a cross-sectional side elevational view of a second preferred embodiment of a control valve for the fluid power circuit of FIG. 1.

DESCRIPTION OF THE PREFERRED EMBODIMENTS

Fluid Power Circuit

Figure 1:
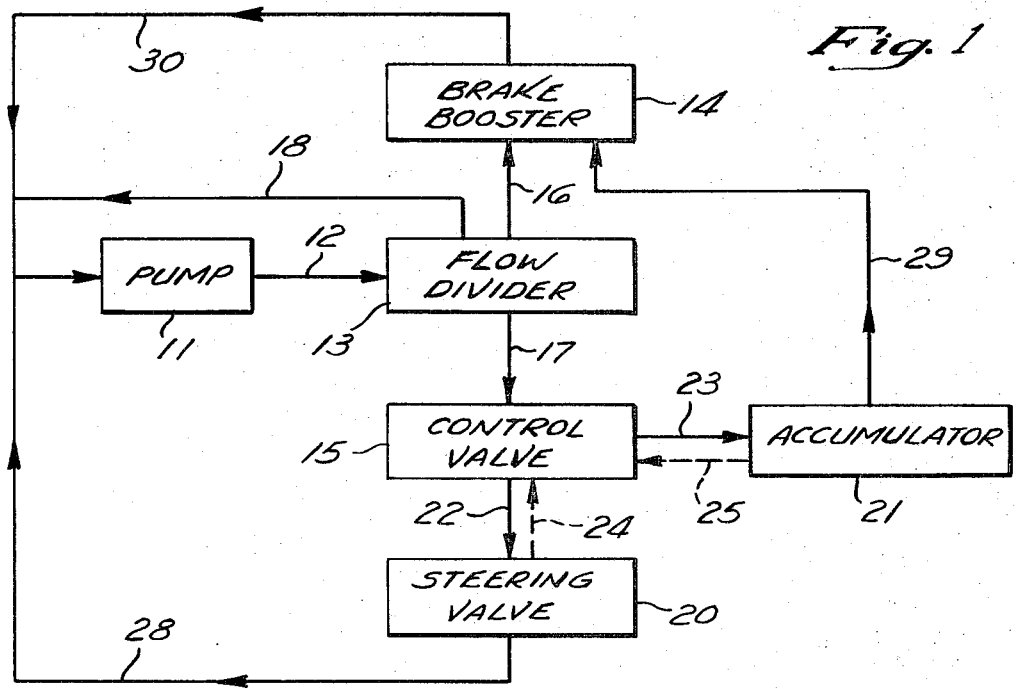
FIG. 1 is a schematic circuit diagram of the motor vehicle fluid power circuit according to the principles of the invention.

Referring now to the drawings in greater detail, FIG. 1 is a schematic circuit diagram of a motor vehicle fluid power circuit incorporating the principles of the invention.

The circuit shown in FIG. 1 includes a hydraulic pump 11 providing a source of fluid power for the circuit. The pump 11 is driven by the engine of the motor vehicle (not shown), and in the preferred embodiment the pump 11 is a constant displacement pump having an output of 2.5 gallons per minute and is of type commonly used in motor vehicle power steering systems at the present time. The pump 11, in a well-known manner, includes an internal relief valve which connects the outlet of the pump to the inlet of the pump when a predetermined maximum pressure is reached to prevent damage to the pump or to the remainder of the circuit. In the embodiment shown in the drawings, the internal relief pressure of the pump 11 is set at 1,200 p.s.i.

A suitable line 12 carries the entire output of the pump 11 to a flow divider 13. The flow divider 13, as discussed in detail below with particular reference to FIG. 2, directs 20 percent of the fluid which it receives from the pump 11 to a brake booster 14 and 80 percent of the fluid which it receives from the pump 11 to a steering valve 15 through lines 16 and 17, respectively. A relief line 18 leads from the flow divider 13 to the inlet side of the pump 11.

The control valve 15, as discussed in detail below with particular reference to FIGS. 4 and 5, selectively directs the the fluid which it receives from the flow divider 13 to either a steering valve 20 or to an accumulator 21 through lines 22 and 23, respectively. The dotted lines 24 and 25 illustrate that feedback signals are transmitted from the steering valve 20 and the accumulator 21 to the control valve 15 as also discussed below with particular reference to FIGS. 4 and 5.

The steering valve 20 is an open center steering valve of the type conventionally used in automobiles. The steering valve 20 directs the fluid which it receives back to the pump 11 through a drain line 28 when the steering valve is in its neutral or center position. When fluid power from the pump 11 is required to assist in the steering of the vehicle and the steering valve 20 is displaced from its center position, the steering valve 20 directs at least some of the fluid received through the line 22 to a fluid motor of the motor vehicle power steering system in a well-known manner.

The accumulator 21 is of any suitable well-known type which stores the fluid which it receives through the line 23 under pressure for a reserve of high pressure fluid available to the brake booster 14 in the event of fluid pressure failure from the line 16. When the brakes of the vehicle are actuated and there is no fluid supplied from the line 16, the accumulator 21 supplies high pressure hydraulic fluid through the line 29 to operate the brake booster 14.

Under normal operating conditions, the brake booster 14, as described below with particular reference to FIG. 3, utilizes the fluid which it receives through the line 16 to provide an open center hydraulic circuit to assist the operator in braking the motor vehicle. In the event of abnormal or emergency operating conditions such that fluid power is not supplied to the brake booster 14 through the line 16, a closed center reserve capacity circuit is provided from the accumulator 21 through the line 29 to the brake booster 14 to assist the operator in braking the motor vehicle. When the brakes of the vehicle are released, the brake booster 14 directs the fluid which it has received back to the pump 11 through the drain line 30.

Flow Divider

Figure 2:
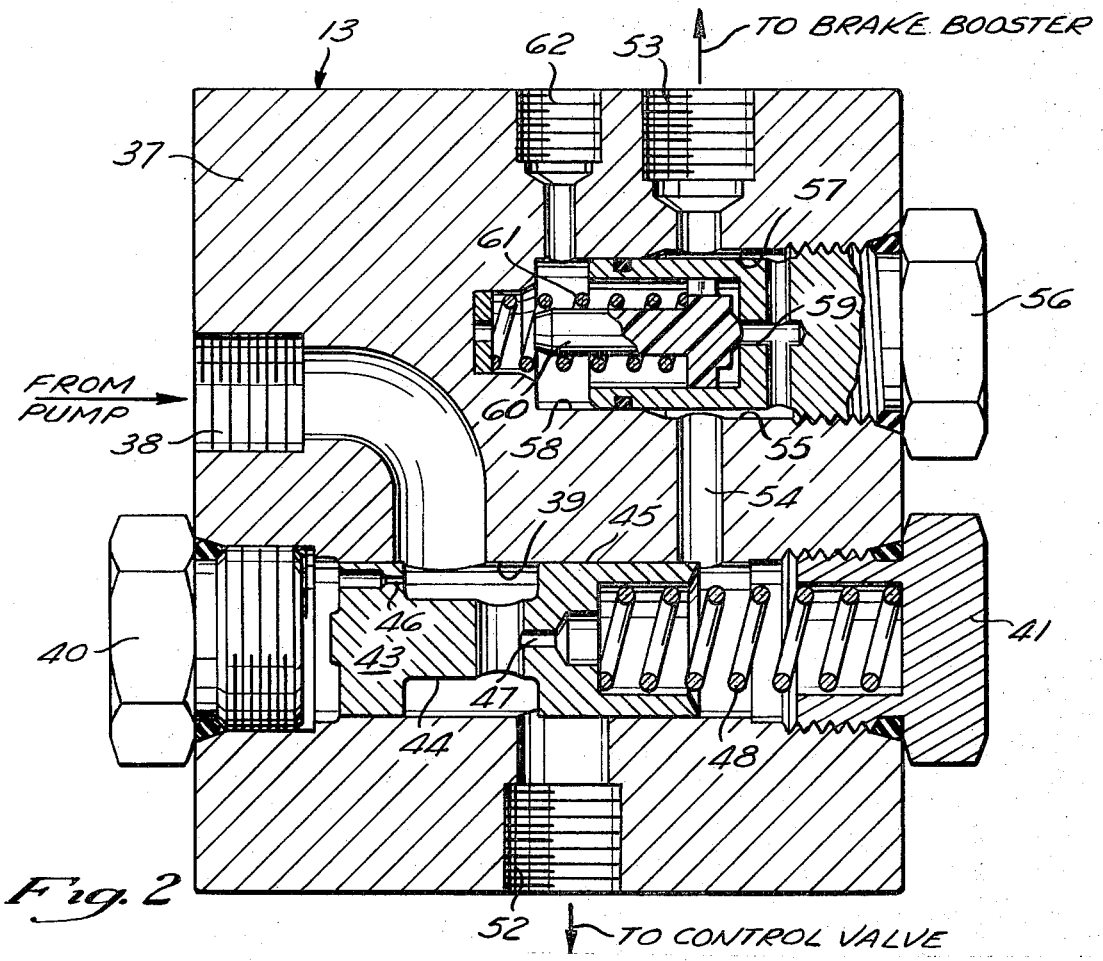
FIG. 2 is a cross-sectional side elevational view of a flow divider for the fluid power circuit of FIG. 1.

Referring now to FIG. 2, a flow divider 13 is shown which directs 20 percent of the fluid which it receives from the pump 11 to the brake booster 14 and 80% of the fluid which it receives from the pump 11 to the control valve 15.

The control valve 15 includes a housing 37 which may be formed of brass or other suitable material. The housing 37 includes an inlet port 38 for receiving fluid from the pump 11 through line 12. The inlet port 38 is hydraulically connected to a bore 39 which extends through the housing 37. The opposite ends of thee bore 39 are closed by suitable plugs 40 and 41 which are threadably received by the ends of the bore 39. Suitable seals are carried by the plugs 40 and 41 for preventing fluid leakage between the plugs and the housing 37.

A control spool 43 is slidably disposed in the bore 39. The control spool 43 includes a reduced diameter center portion 44 and a valving land 45. A bleed passage 46 extends through the control spool 43 and maintains throttled fluid pressure communication between the inlet port 38 and the left end face of the control spool 43. A restricted passage 47 provides throttled fluid pressure communication between the inlet port 38 and the right end face of the control spool 43. A coil spring 48 acts between the plug 41 and the control spool 43 and biases the control spool 43 to the left as viewed in FIG. 2.

The flow divider 13 also includes a control valve outlet port 52 which is hydraulically connected to the control valve 15 by the line 17 and a brake booster outlet port 53 which is hydraulically connected to the brake booster 14 through the line 16. A suitable passage 54 leads from the bore 39 to the brake booster outlet port 53, and an intersecting bore 55 extends through the flow divider housing 37 and intersects the passage 54. A plug 56 is threadably secured in the right end of the intersecting bore 55, and a suitable seal prevents fluid leakage between the plug 56 and the housing 37.

The intersecting bore 55 is a stepped bore and includes a larger diameter portion 57 and a smaller diameter portion 58. The left end of the plug 56 sealingly engages the smaller diameter portion 58, but the plug 56 is spaced from the larger diameter portion 57 to provide an annular passage which establishes open fluid pressure communication between the passages 54 and the brake booster outlet port 53.

A relief passage 59 in the plug 56 is closed by a poppet 60 which is spring biased to the right as viewed in FIG. 2 by a coil spring 61. The downstream side of the closed relief passage 59 is hydraulically connected to a relief port 62. The relief port 62 is hydraulically connected to the inlet side of the pump 11 through the line 18 shown in FIG. 1.

Turning now to the operation of the flow divider shown in FIG. 2, when the pump 11 is stopped and there is no fluid flowing in the circuit, the control spool 43 is pushed to the far left against the plug 40 by the spring 48. In this position, the valving land 45 blocks off the control valve outlet port 52. When the pump 11 is started, fluid enters the flow divider 13 through the inlet port 38 and begins to flow through the restricted passage 47 to the brake booster outlet port 53. Because the brake booster is an open center device, the outlet port 53 may be considered a direct connection to the drain line 30 so long as the brake booster is not actuated. Similarly, since the control valve 15 and the steering valve 20 are both open center valves, the control valve outlet port 52 may be considered a direct connection to the drain line 28 so long as the control valve 15 is open and the steering valve 20 is in its neutral or center position.

When the fluid flowing through the restricted passage 47 reaches a flow rate of about 0.5 gallons per minute, the pressure in the inlet port 38 begins to increase because of the small size of the restricted passageway 47. This causes the pressure acting on the left side of the control spool 43 through the bleed passage 46 to move the control spool 43 to the right against the bias of the spring 48 until the valving land 45 is moved far enough to the right to permit flow from the inlet port 38 to the control valve outlet port 52. As stated above, with particular reference to the fluid power circuit of FIG. 1, the output of the pump 11 is about 2.5 gallons per minute, so that 0.5 gallons per minute flows through the restricted passage 47 to the brake booster outlet port 53 and the remaining 2.0 gallons per minute flows to the control valve outlet port 52.

The flow divider 13 maintains this ratio of approximately 20 percent of the flow to the brake booster 14 and approximately 80 percent of the flow to the control valve 15 under all pressure conditions. For example, if the brake booster 14 is actuated so that the pressure in the brake booster outlet port 53 increases, this increased pressure acts on the right end face of the control spool 43 and begins to move the control spool 43 to the left as viewed in FIG. 2. This causes the valving land 45 to restrict the flow of fluid to the control valve outlet port 52 so that the pressure from the pump 11 in the inlet port 38 increases because the pump 11 is a constant displacement pump and the pressure must increase to get past this restriction. This increased pressure in the inlet port 38 also acts on the left end of the control spool 43 through the bleed passage 46. Under these conditions of increased brake booster pressure, the pressure in the inlet port 38 is increased and the control spool 43 is moved slightly to the left so that the valving land 45 maintains a flow of about 2.0 gallons per minute to the control valve outlet port 52 even under these conditions of increased brake booster pressure.

The flow divider 13 also maintains this ratio when the brake booster is deactuated so that the brake booster outlet port 53 is at drain line pressure and the pressure in the control valve outlet port 52 increases because the control valve 15 or the steering valve 20 is actuated. Under these conditions of increased pressure in the control valve outlet port 52, the pressure from the pump in the inlet port 38 increases. This increased pressure acts on the left end face of the control spool 43 through the bleed passage 46 and moves the control spool 43 to the right so that the valving land 45 further opens the passage leading to the control valve outlet port 52. This decreases the restriction of flow from the inlet port 38 to the control valve outlet port 52 so that the 2.0 gallons per minute flow rate to the control valve outlet port 52 is maintained.

As discussed above, with particular reference to the fluid power circuit shown in FIG. 1, the pump 11, in a conventional manner, has an internal relief valve which opens to connect the pump outlet directly to the pump inlet to reduce the output flow rate from the pump 11 substantially to zero when the pressure in the outlet line 12 reaches 1,200 p.s.i. This assures that the pump will not be damaged and that the system will not be subjected to excess pressures. The relief poppet 60 of flow divider 13 is, by calibration of the spring 61, arranged to open at 1,150 p.s.i., which is less than the internal relief pressure of the pump 11. In this manner, when the pressure in the brake booster outlet port 53 reaches 1,150 p.s.i., the relief poppet 60 opens to connect the relief passage 59 to the relief outlet 62 which is connected to the drain line 26. This assures that the pump 11 cannot reach its internal relief pressure by actuation of the brake booster 14 so that the supply of fluid from the pump 11 to the control valve 15 cannot be interrupted by high pressure actuation of the brake booster 14.

Brake Booster

Figure 3:
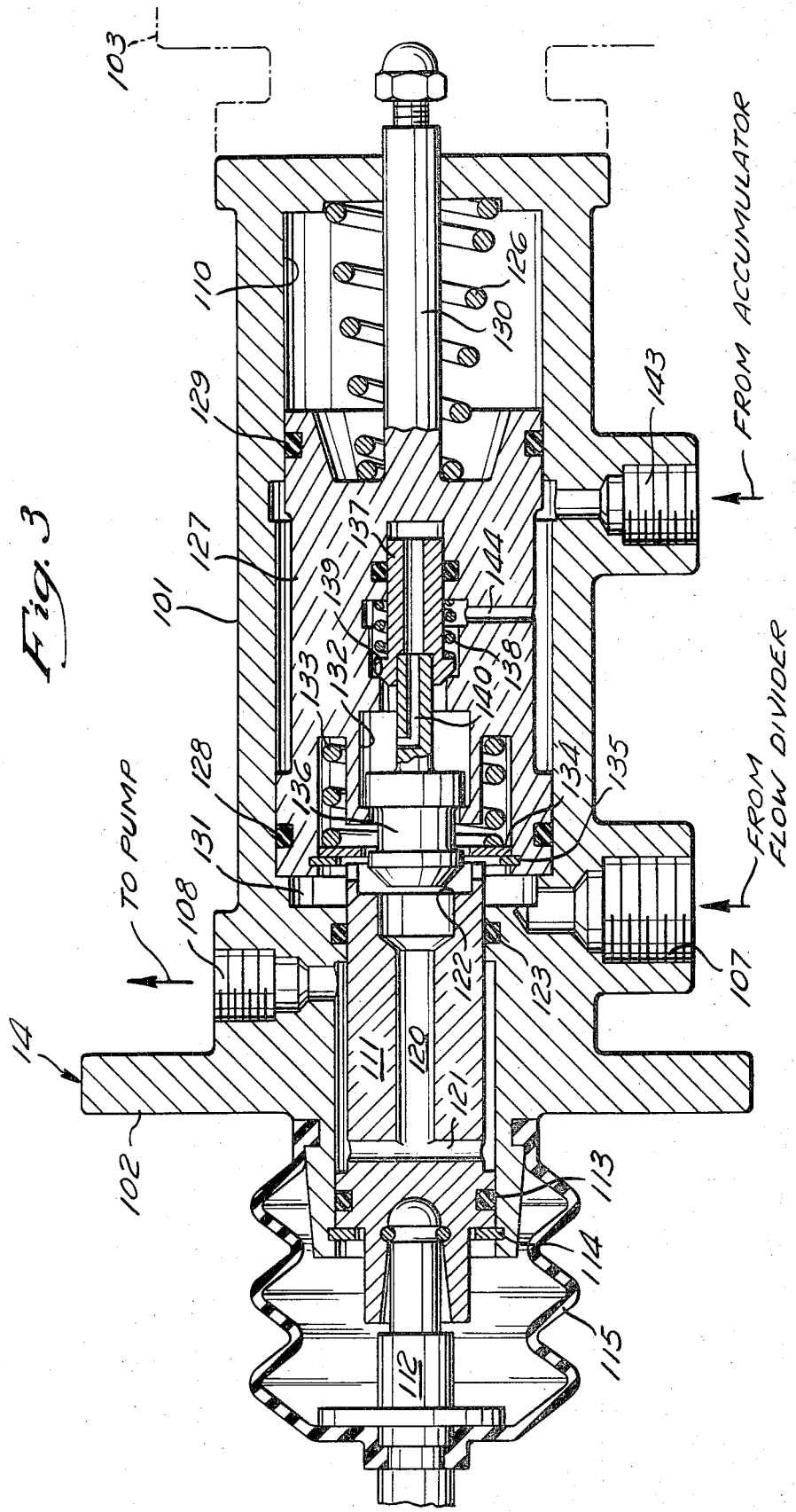
FIG. 3 is a cross-sectional side elevational view of a brake booster for the fluid power circuit of FIG. 1.

Turning now to FIG. 3, the preferred embodiment of the brake booster 14 is shown for the circuit of FIG. 1. The brake booster 14 includes a generally cylindrical axially extending housing 101. An annular mounting flange portion 102 is provided on the left end of the housing 101 for securing the brake booster 14 to a firewall (not shown) of the motor vehicle. The brake booster 14 is interposed between the foot-operated brake pedal (not shown) of the motor vehicle and the master cylinder 103 to assist the operator in the application of the brakes in a manner discussed in detail below.

The housing 101 includes a threaded inlet port 107 which is hydraulically connected to the line 16 in FIG. 1 to receive 20 percent of the output flow of the pump 11 (0.5 gallons per minute) from the flow divider 13. A one-way check valve (not shown) may be placed in the inlet port 107 to permit flow from the flow divider 13 to the brake booster 14 under normal operating conditions, but to prevent reverse flow from the brake booster 14 to the flow divider 13 when the brake booster is operated under emergency conditions by the accumulator 21 in the manner described below. A threaded outlet port 108 is hydraulically connected to the drain line 30 in the circuit shown in FIG. 1 to return the fluid to the inlet side of the pump 11.

As further shown in FIG. 3, a bore 110 extends axially from end to end through the housing 101. An input rod 111 is slidably disposed in the left end of the bore 110, and a connecting rod 112 is secured to the input rod 111 by a suitable retaining ring to connect the brake pedal (not shown) to the input rod 111. A seal 113 prevents fluid leakage between input rod 111 and the bore 110, and a snap ring 114 prevents the input rod 111 from being pulled out of the left end of the bore 110. A suitable dust cap 115 is also provided to prevent dust or other contaminants from entering the left end of the bore 110.

An axially extending blind bore 120 extends from one end of the input rod 111, and a radial passage 121 establishes open fluid pressure communication between the blind bore 120 and the outlet port 108 under all conditions. The annular end portion 122 of the input rod 111 which surrounds the blind bore 120 provides an annular valve seat as described below. A suitable seal 123 prevents fluid leakage between the bore 110 and the input rod 111.

A power piston 127 is also slidably disposed in the bore 110. A first seal 128 and a second seal 129 prevent fluid leakage between the power piston 127 and the bore 110. The power piston 127 includes an output rod 130 at its right end for exerting a force on the master cylinder 103 to which the brake booster 14 is connected. In the embodiment shown in FIG. 3, the output rod 130 is shown schematically as a single piece with the power piston 127, but the output rod 130 could alternatively be made as a separate piece. The left end of the power piston 127 cooperates with the bore 110 to define a power chamber 131. A return spring 126 urges the power piston 127 to the left to the position shown in FIG. 4.

The power piston 127 is a generally cup-shaped member having a blind bore 132 extending from its left end. A coil spring 133 is carried in a larger diameter left end of the bore 132 and urges a washer 134 against a snap ring 135. The washer 134 is in axially aligned relation with the right end of the input rod 111 and maintains the input rod 111 in the position shown in FIG. 3 when there is no input force on the rod 111.

A poppet 136, which may be of nylon or other suitable material, is slidably disposed in the bore 132. The poppet 136 is secured to a valve member 137, and a spring 138 biases the valve member 137 against a valve seat 139 and retains the poppet 136 and the valve member 137 in the positions shown in FIG. 3 when the input rod 111 is deactuated. A suitable passage 140 extends through the poppet 136 and the valve member 137 and maintains the right end face of the valve member 137 exposed to the pressure of the power chamber 131. This balances the poppet 136 and the valve member 137 so that there is no net effective lateral cross-sectional area of the poppet 136 and valve member 137 exposed to pressure in the fluid power chamber 131.

An accumulator inlet port 143 is hydraulically connected to the accumulator 21 by the line 29. A radial passage 144 in the power piston 127 establishes open fluid pressure communication between the inlet port 143 and the downstream side of the valve member 137.

Turning now to the operation of the brake booster 14, the various parts of the brake booster 14 are in the positions shown in FIG. 3 when there is no input force from the brake pedal of the vehicle on the input rod 111 and the brake booster is deactuated. In this position, the fluid flowing from the inlet port 107 to the outlet port 108 maintains the input rod 111 in the position shown, and the spring 138 maintains the poppet 136 and the valve member 137 in their respective positions. The 0.5 gallons per minute received from the flow divider 13 flows into the inlet port 107, through the power chamber 131, through the space between the valve seat 122 and the poppet 136, through the passages 120 and 121, and through the outlet port 108 which is connected to the drain line 30.

As discussed above with particular reference to the flow divider 13, the flow from the inlet port 107 through the power chamber 131 and out the outlet port 108 is a substantially constant 0.5 gallons per minute. So long as there is little or no restriction to this flow in the brake booster 14, the pressure of this fluid will remain low. However, since the flow rate through the brake booster 14 is constant, the pressure will increase when any restriction is imposed to the flow of fluid through the brake booster 14. Thus, when the operator of the vehicle applies a force to the input rod 111 through the connecting rod 112 and the brake pedal (not shown), the input rod 111 begins to move to the right against the force of the spring 133 so that the valve seat 122 approaches the poppet 136. This imposes a restriction in the flow from the inlet port 107 to the outlet port 108, and causes the pressure in the power chamber 131 to increase. This increased pressure in the power chamber 131 acts to the right on the power piston 127 to apply a force on the master cylinder 103 and acts to the left on the area of the input rod 111 which is exposed to such pressure to provide a resisting force to further depression of the brake pedal so that the operator is able to feel the amount of brake force that he is applying. The flow of fluid from the power chamber 131 to the axial passage 120 is throttled across the valve seat 122 and poppet 136 as the operator continues to apply the brakes of the vehicle. As the power piston 127 moves to the right, the force applied by the operator to the brake pedal also moves the input rod 111 to the right.

When an increased input force is applied by the operator to the input rod 111, the valve seat 122 approaches closer to the poppet 136 to further restrict the flow of fluid from the inlet port 107 so that the pressure in the power chamber 131 is further increased and the brakes of the vehicle are applied more forcefully. When the operator applies a constant force to the input rod 111 (that is, a force which is neither increasing nor decreasing in magnitude) the distance between the valve seat 122 and the poppet 136 is maintained constant so that the pressure in the power chamber 131 will be constant and the force urging the power piston 127 to the right is constant to provide a constant application of the brakes.

When the operator decreases the force on the input rod 111 to begin to release the brakes, the force of the fluid pressure in the power chamber 131 acting against the portion of the input rod 111 which is exposed to such pressure begins to move the input rod 111 to the left. This movement of the input rod 111 to the left moves the valve seat 122 away from the poppet 136 and decreases the restriction of the flow from the inlet port 107 to the outlet port 108. This decreases the pressure in the power chamber 131, and the forces acting to the left on the power piston 127 by the return spring 126 and by the reaction forces on the output rod 130 from the master cylinder 103 move the power piston 127 to the left as the input rod 111 is moving to the left. This leftward movement of the input rod 111 and the power piston 127 continues until the brakes have been fully released.

The brake booster 14 functions in this manner, and the valve member 137 is never moved away from the valve seat 139 under normal operating conditions. However, in the event of malfunction in the circuit so that no fluid or insufficient fluid is supplied through the line 16 to the inlet port 107, application of a force to the brake pedal moves the input rod 111 to the right until the valve seat 122 engages the poppet 136. This completely isolates the fluid power chamber 131 from the outlet port 108. After this occurs, further movement of the input rod 111 to the right pushes the poppet 136 and the valve member 137 to the right also against the spring 138. This slightly separates the valve member 137 from the valve seat 139 to establish throttled fluid pressure communication between the inlet port 143 from the accumulator 21 and the fluid power chamber 131. The fluid pressure in the inlet port 143 is maintained by the accumulator 21 at a pressure of about 1,000 p.s.i., and this high pressure is throttled between the valve member 137 and the valve seat 139 so that fluid at a lower pressure enters the power chamber 131. When this occurs and the fluid pressure in the power chamber 131 increases, the one-way check valve (not shown) in the inlet port 107 closes and prevents reverse flow of fluid from the power chamber 131 to the line 16.

This fluid entering the power chamber 131 begins to move the power piston 127 to the right. If an input force of increasing magnitude is applied by the operator to the input rod 111, the input rod 111 moves to the right with the power piston 127. This holds the valve member 137 away from the valve seat 138 to increase the pressure in the fluid power chamber 131.

When a constant input force (that is, a force which is neither increasing nor decreasing in magnitude), is applied by the operator to the input rod 111, the input rod 111 terminates further movement to the right. When this occurs, any additional movement of the power piston 127 to the right moves the valve seat 139 against the valve member 137 to hydraulically isolate the inlet port 143 from the power chamber 131. Under these conditions, the force applied on the power piston 127 by the fluid in the power chamber 131 will be constant.

When the operator decreases the input force applied to the input rod 111, the force of the fluid in the power chamber 131 acting against the input rod 111 begins to move the input rod 111 to the left. This separates the valve seat 122 from the poppet 136 and establishes throttled fluid pressure communication between the power chamber 131 and the outlet port 108 to decrease the pressure in the power chamber 131. The force of the return spring 126 acting on the power piston 127 and the reaction forces of the master cylinder 103 on the output rod 130 move the power piston 127 to the left as the input rod 111 is moving to the left until the various parts of the brake booster 14 return to the deactuated position shown in FIG. 3.

In this manner, the brake booster 14 provides open center operation of the brakes of the vehicle under normal operating conditions and closed center operation of the brakes of the vehicle under abnormal or emergency conditions resulting from a malfunction in the open center circuit.

First Embodiment of Control Valve

Figure 4:
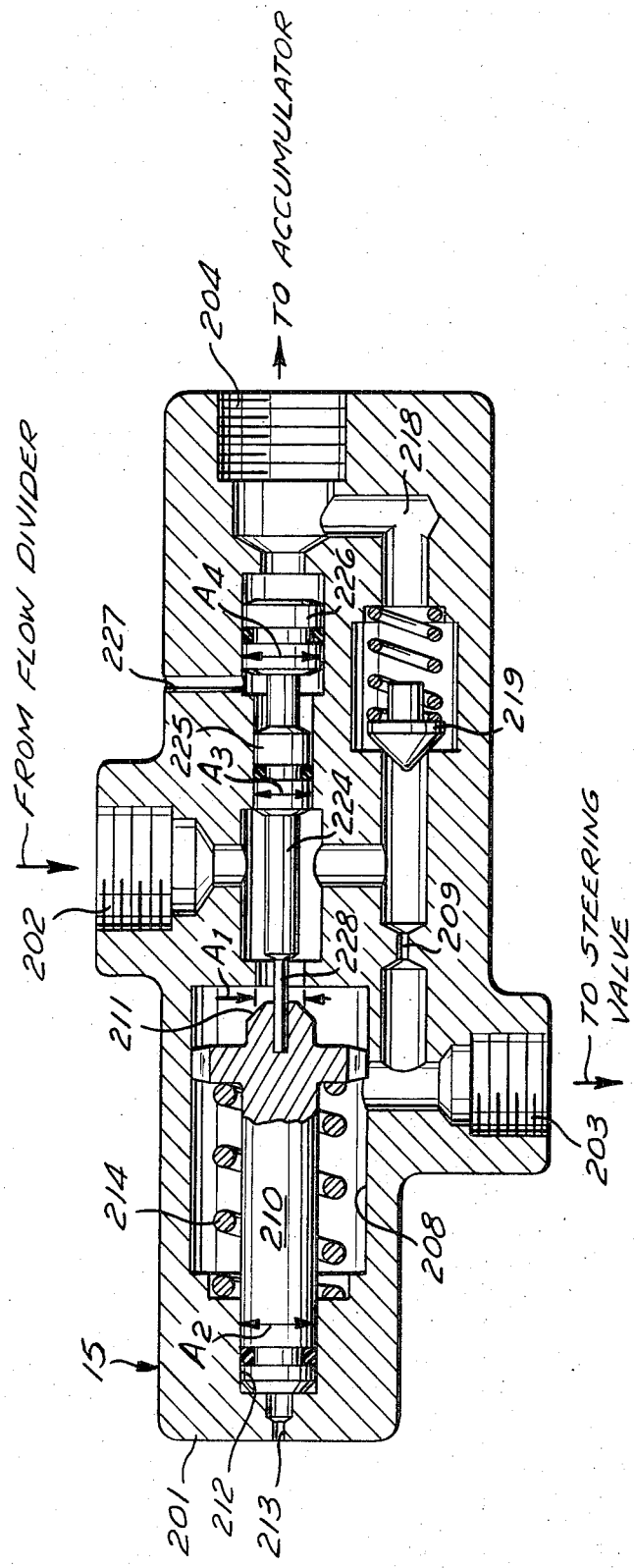
FIG. 4 is a cross-sectional side elevational view of a first preferred embodiment of a control valve for the fluid power circuit of FIG. 1.

Referring now to FIG. 4, a first preferred embodiment of the control valve 15 used in the circuit of FIG. 1 is shown. The control valve 15 includes a housing 201 which may be formed of brass or other suitable material. The housing 201 includes an inlet port 202 which is hydraulically connected to the line 17 shown schematically in FIG. 1 to receive approximately 80 percent of the output flow of the pump 11 under all conditions, as discussed above with particular reference to the flow divider 13. The housing 201 also includes a first outlet port 203 for being hydraulically connected to the line 22 for supplying fluid to the steering valve 20. As explained in detail below, the steering valve outlet port 203 also receives the feedback signal from the steering valve 20 shown schematically as reference numeral 24 in FIG. 1. The housing 201 is further provided with a second outlet port 204 for being hydraulically connected to the line 23 for supplying fluid to the accumulator 21. As explained in detail below, the accumulator outlet port 204 also receives the feedback signal from the accumulator 21 shown schematically as reference numeral 25 in FIG. 1.

A first passage 208 and a bleed passage 209 establish fluid pressure communication between the inlet port 202 and the steering valve outlet port 203. A loading spool or poppet 210 is slidably disposed in the first passage 208 for movement between a closed position in which an annular valve head portion 211 engages an annular valve seat in the passage 208 to close the passage 208 and an open position in which the annular valve head 211 is separated from the valve seat to open the passage 208. When the loading spool 210 is in its closed position to the right of that shown in FIG. 4, a lateral cross-sectional area $A_1$ of the spool 210 is exposed to the fluid pressure in the inlet port 202.

The left end of the loading spool 210 is slidably disposed in a reduced diameter bore 212 which is vented to atmospheric pressure by a passage 213. The left end of the loading spool 210 carries a suitable seal for preventing fluid leakage between the spool 210 and the bore 212, and the vent passage 213 may be provided with a suitable dust cap to prevent dust and other foreign materials from entering the bore 212. In this manner, an area $A_2$ of the loading spool 210 is exposed to atmospheric pressure under all conditions. As discussed in detail below, this area $A_2$ of the end of the spool 210 which is exposed to atmospheric pressure is greater than the area $A_1$ of the other end of the spool which is exposed to inlet port pressure when the valve head 211 engages its associated valve seat. A loading spring 214 acts between the housing 201 and the loading spool 210 to exert a force $F_s$ to bias the loading spool 210 to the right to the closed position from that shown in FIG. 4 to load the pump 11 when the accumulator is being charged as described below.

A second passage 218 hydraulically connects the inlet port 202 to the accumulator outlet port 204. A one-way check valve 219 cooperates with an annular shoulder in the second passage 218 to prevent return flow from the accumulator 21 to the inlet port 202. A suitable coil spring biases the check valve 219 to the closed position shown in FIG. 4.

A one-piece unloading spool 224 is slidably disposed in the right end of the first passage 208 as viewed in FIG. 4. The unloading spool 224 includes a smaller diameter portion 225 of lateral cross-sectional area $A_3$ which slides in a smaller diameter portion of the passage 208 and a larger diameter portion 226 of lateral cross-sectional area $A_4$ which slides in a larger diameter portion of the passage 208. Suitable seals are provided to prevent fluid leakage between the first passage 208 and the spool portions 225 and 226. The area differential of the unloading spool 224 (that is, the difference between the lateral cross-sectional area $A_4$ of the larger diameter portion 226 and the lateral cross-sectional area $A_3$ of the smaller diameter portion 225) is exposed to atmospheric pressure through a suitable vent passage 227. A suitable dust cap may be provided in the vent passage 227 to prevent the infiltration of foreign materials. In this manner, the smaller diameter portion 225 of the unloading spool 224 is exposed to inlet port pressure through the inlet port 202, the larger diamater portion 226 is exposed to accumulator pressure through the accumulator outlet port 204, and the area differential between the portions 225 and 226 is exposed to atmospheric pressure through the vent 227.

The left end of the unloading spool 224 includes an elongated abutment portion 228 which is loosely slidably received in a blind bore in the right end of the loading spool 210. As discussed in detail below, the lateral cross-sectional area $A_3$ of the unloading spool 224 exposed to inlet port pressure is greater than the lateral cross-section area $A_1$ of the loading spool 210 exposed to inlet port pressure when the spool 210 is closed.

Turning now to the operation of the control valve shown in FIG. 4, the force urging the spools 210 and 224 to the right is the sum of the force $F_s$ of the spring 214 and the force $P_iA_3$ created by inlet port pressure $P_i$ acting on spool area $A_3$. The force urging the spools 210 and 224 to the left is the sum of the force $P_iA_1$ created by inlet port pressure $P_i$ acting on spool area $A_1$, plus the force $P_s(A_2 - A_1)$ created by steering valve pressure $P_s$ acting on the difference between the area $A_2$ and the area $A_1$, plus the force $P_aA_4$ created by accumulator pressure in the port 204 acting on spool area $A_4$. When these forces acting to the left on the spools 210 and 224 are equal to the forces acting to the right, $$P_iA_1 + P_s(A_2 - A_1) + P_aA_4 = F_s + P_iA_3.$$

The spools 210 and 224 are moved to the left to the positions shown in FIG. 4 when the forces acting to the left (the left side of the above equation) are greater than the forces acting to the right (the right side of the above equation) so that there is a net force acting to the left. Similarly, the spools 210 and 224 are moved to the right to close the passage 208 and load the pump 11 when the forces acting to the right are greater than the forces acting to the left.

When the accumulator 21 is fully charged and the steering valve 20 is in its neutral position, the various components of the control valve 15 are in the positions shown in FIG. 4. Under these conditions, the fluid received by the control valve 15 from the flow divider 13 is at a low pressure as explained in detail above with particular reference to the flow divider 13. The fluid which is transmitted through the line 17 is received by the inlet port 202 and flows through the open first passage 208, through the steering outlet port 203, through the line 22, and through the open center steering valve 20 to the drain line 28. Because the high pressure $P_a$ in the fully charged accumulator 21 is greater than this low pressure $P_i$ in the inlet port 202, the pressure in the second passage 218 retains the one-way check valve 219 against its associated valve seat so that the flow of fluid from the inlet port 202 to the accumulator outlet port 204 is blocked. Additionally, because $P_a$ is high and $P_i$ is low under these conditions, the forces acting to the left on the spools 210 and 234 (the left side of the above equation) is greater than the forces acting to the right (the right side of the above equation) so that the abutment portion 228 of the unloading spool 224 engages the end of the blind bore in the loading spool 210 and moves the loading spool 210 to its left or open position against the biasing force of the spring 214 under these conditions to unload the pump 11. The circuit shown in FIG. 1 and the control valve shown in FIG. 4 continue to function in this manner so long as the accumulator 21 remains fully charged and there is no restriction imposed by the steering valve 20.

When the steering valve 20 is in the neutral position so that the pressure in the inlet port 202 is low and the pressure $P_a$ in the accumulator 21 decreases below a predetermined minimum charge pressure, the forces acting to the right on the spools 210 and 224 (the right side of the above equation) exceed the forces acting to the left on the spools 210 and 224 (the left side of the above equation) so that the spools 210 and 224 move to the right from the positions shown in FIG. 2. This causes the valve head portion 211 to engage its associated valve seat and close the first passage 208. This imposes a restriction in the flow of fluid from the pump 11 and, as discussed above with particular reference to the flow divider 13, loads the pump 11 to increase the output pressure of the pump 11. When the pump pressure exceeds the pressure in the accumulator 21, the increased pump pressure in the inlet port 202 unseats the check valve 219, and fluid flows from the inlet port 202 to the accumulator 21 to recharge the accumulator 21.

If, during this charging of the accumulator 21, the steering valve 20 is moved from its neutral position to impose a restriction between the line 22 and the drain line 28, the small amount of fluid flowing through the bleed passage 209 to the line 22 will cause the pressure in the steering valve 20 to increase. This increased pressure in the steering valve 20 increases the pressure in the steering valve outlet port 203, and this increased pressure $P_s$ acts on the area differential ($A_2 - A_1$) of the loading spool 210 exposed to such pressure and moves the loading spool 210 from the closed position to the left to the open position. This provides the feedback signal indicated by reference numeral 24 in FIG. 1 and opens the first passage 208 to interrupt the charging of the accumulator 21 and direct the flow of fluid from the inlet port 202 to the steering valve 20 through the steering valve outlet port 203. In this manner, the area differential of the loading spool 210 which is exposed to the fluid pressure of the steering valve outlet port 203 interrupts charging of the accumulator 21 when the steering valve 20 is actuated so that flow to the steering valve 20 under all conditions has priority over flow to the accumulator 21.

After the steering valve 20 then returns to its neutral position, the pressure in the steering valve outlet port 203 is reduced because the flow restriction between the line 22 and the drain line 28 is thereby removed. This reduces the pressure $P_s$ acting on the area differential ($A_2 - A_1$) of the loading spool 210, and the loading spring 214 moves the spool 210 back to its closed position. When this occurs, the fluid received in the inlet port 202 from the flow divider 13 again unseats the check valve 219 in the second passage 218 and directs the flow to the accumulator outlet port 204 to complete the charging cycle of the accumulator.

When the pressure $P_a$ in the accumulator 21 reaches the predetermined fully charged pressure, the forces acting to the left on the spools 210 and 224 (the left side of the above equation) exceed the forces acting to the right on the spools 210 and 224 (the right side of the above equation) so that the spools 210 and 224 begin to move to the left. As soon as the valve head 211 begins to move away from its associated valve seat in the first passage 208, the pressure $P_i$ in the inlet port 202 decreases. Because the area $A_3$ is greater than the area $A_1$, the right side of the above equation is decreased more than the left side when $P_i$ is so decreased. This moves the spools 210 and 224 still further to the left so that inlet port pressure $P_i$ decreases still more. This causes what may be described as a "cascade effect" and results in very fast movement of the spools 210 and 224 to the left when the accumulator is fully charged to preclude overcharging the accumulator 21. The fully charged pressure of the accumulator 21 may be changed by changing the force $F_s$ of the spring 214, as may be seen by algebraically solving the above equation for the term $F_s$.

Second Embodiment of Control Valve

A second embodiment of a control valve which may be used in the circuit of FIG. 1 in place of the control valve 15 is shown in FIG. 5. As shown in FIG. 5, a control valve includes a housing 301 which may be formed of brass or other suitable material. The housing 301 includes an inlet port 302 which is hydraulically connected to the line 17 shown schematically in FIG. 1 to receive approximately 80% of the output flow of the pump 11 under all conditions, as discussed above with particular reference to the flow divider 13. The housing 301 also includes a first outlet port 302 for being hydraulically connected to the line 22 shown in FIG. 1 for supplying fluid to the steering valve 20. As explained in detail below, the steering valve outlet port 303 also receives the feedback signal from the steering valve 20 shown schematically as reference numeral 24 in FIG. 1. The housing 301 is further provided with a second outlet port 304 for supplying fluid to the accumulator 21 through the outlet line 23. The accumulator outlet port 304 also receives the feedback signal from the accumulator 21 shown schematically as reference numeral 25 in FIG. 1.

As shown in FIG. 5, a first passage 308 hydraulically connects the inlet port 302 with the steering valve outlet port 303. The first passage 308 is a stepped passage which includes a smaller diameter portion 309, and an intermediate diameter portion 310, and a larger diameter portion 311. The rightmost end of the first passage 308 is threaded and receives a threaded end fitting 312. The end fitting 312 includes a vent passage 313 which vents the right side of the larger diameter portion 311 to atmospheric pressure. The vent passage 313 may be provided with a suitable dust cap for preventing contaminants from entering the interior of the end fiting 312. The rightmost end of the end fitting 312 is provided with a bore 314.

A loading spool or poppet 319 is disposed in the passage 308 for movement between an open position illustrated in FIG. 5 for opening the first passage 308 and a closed position in which an annular valve head portion 320 of the loading spool 319 engages an annular valve seat formed at the junction of the smaller diameter portion 309 and the intermediate diameter portion 310. A stepped bore 321 extends axially from end to end through the loading spool 319. A tubular member 322 is slidably and sealingly carried in the larger diameter portion of the stepped bore 321 and is slidably and sealingly carried at its other end in the bore 314 of the end fitting 312. A bleed passage 324 extends radially from the axial passage 321 of the loading spool 319 and establishes throttled fluid pressure communication between the inlet port 302 and the steering valve outlet port 303 in a manner described below. A loading spring 326 urges the loading spool 319 from the open position shown in FIG. 5 to a closed position to load the pump 11 for charging the accumulator 21 as described below.

As further shown in FIG. 5, the left end of the loading spool 319 includes a leftwardly facing annular lateral cross-sectional area $A_1$ exposed to pressure in the inlet port 302 when the loading spool 319 is in its closed position. The annular area $A_1$ is equal to the difference between the lateral cross-sectional area of the valve head portion 320 which engages the valve seat in the first passage 308 and the lateral cross-sectional area of smaller diameter portion of the bore 321. The loading spool 319 also includes an annular lateral cross-sectional area $A_2$ exposed to the pressure in the steering valve outlet port 303 when the loading spool 319 is in its closed position. This annular area $A_2$ is equal to the difference between the lateral cross-sectional area of the intermediate bore portion 310 and the lateral cross-sectional area of the portion of the valve head 320 which engages the valve seat in the first passage 308.

At the right end of the loading spool 319, a rightwardly facing annular area $A_3$ is exposed to the pressure $P_i$ in the fluid inlet port 302 to urge the spool 319 to the left to its closed position. The area $A_3$ is exposed to the pressure $P_i$ in the inlet port 302 through the axial passage 321, and the area $A_3$ is equal to the difference between the lateral cross-sectional area of the larger diamter portion of the stepped passage 321 in which the tubular member 322 is disposed and the lateral cross-sectional area of the smaller diameter portion of axial passage 321. Because the left and right ends of the tubular member 322 are of equal lateral cross-sectional areas, the tubular member 322 does not alter the rightwardly facing area $A_3$ exposed to inlet port pressure through the stepped passage 321. However, if the tubular member 322 had a larger cross-sectional area at its right end than at its left end (that is, if the bore 314 were of larger diameter than the portion of the stepped bore 321 in which the tubular member is disposed), then the area $A_3$ would thereby be increased. The tubular member 322 is made as a separate piece from the loading spool 319 to eliminate concentricity problems which would occur in the manufacture of the control valve shown in FIG. 5 if the loading spool 319 and the tubular member 322 were made of one piece. For this reason, the tubular member 322 may be considered a part of the loading spool 319, and the area $A_3$ refers to the rightwardly facing net effective lateral cross-sectional area exposed to pressure of the inlet port 302 which urges the loading spool 319 to the left as viewed in FIG. 5.

An annular lateral cross-sectional area $A_4$ is exposed to pressure $P_a$ of the accumulator outlet port 304 to urge the loading spool 319 to the right to the open position. The area $A_4$ is an annular area equal to the difference between the lateral cross-sectional area of the the larger diameter bore portion 311 and the intermediate diameter bore portion 310. A passage 325 in the housing 301 hydraulically connects the accumulator outlet port 304 to the area $A_4$.

A second passage 328 extends through the housing 301 and hydraulically connects the inlet port 302 to the accumulator outlet port 304. As shown in FIG. 5, a one-way check valve 329 is provided in the second passage 328 for allowing flow in a direction from the inlet port 302 to the accumulator outlet port 304 and for preventing reverse flow of fluid from the accumulator outlet port 304 to the inlet port 302.

Turning now to the operation of the control valve shown in FIG. 5, the total force urging the loading spool 319 to the right is the sum of the force $P_iA_1$ created by inlet port pressure $P_i$ acting on spool area $A_1$, plus the force $P_sA_2$ created by steering valve pressure $P_s$ in the steering valve outlet port 303 acting on spool area $A_2$, plus the force $P_a A_4$ created by accumulator pressure $P_a$ in the accumulator outlet port 304 acting on the spool area $A_4$. The total force urging the loading spool 319 to the left as viewed in FIG. 5 is the sum of the force $P_iA_3$ created by the inlet port pressure $P_i$ acting on spool area $A_3$ plus the force $F_s$ of the spring 326. When these forces acting to the left on the loading spool 319 are equal to the forces acting to the right, $$F_s + P_iA_3 = P_iA_1 + P_sA_2 + P_a A_4.$$

The unloading spool 319 is moved to the right of the open position shown in FIG. 5 when the forces acting to the right (the right side of the above equation) are greater than the forces acting to the left (the left side of the above equation), so that there is a net force acting to the right. Similarly, the loading spool 319 is moved to the left to close the first passage 308 and load the pump 11 when the left side of the above equation is greater than the right side of the above equation so that there is a net force acting to the left.

When the accumulator 21 is fully charged and the steering valve 20 is in its neutral position, the various components of the control valve are in the positions shown in FIG. 5. Under these conditions the fluid received from the flow divider 13 through the line 17 is at a low pressure as described above with particular reference to the flow divider 13, and all of the fluid which is received through the line 17 flows to the inlet port 302, through the first passage 308, and out the steering valve outlet port 303. Because the pressure $P_a$ in the fully charged accumulator 21 is relatively high the right side of the above equation exceeds the left side and the force $P_aA_4$ holds the loading spool 319 in the right or open position shown in FIG. 5 to unload the pump. The circuit shown in FIG. 1 and the control valve shown in FIG. 5 continue to function in this manner so long as the accumulator 21 remains fully charged and there is no restriction in the circuit imposed by the steering valve 20.

When the steering valve 20 is in the neutral position so that the pressure in the inlet port 302 is low, and the pressure $P_a$ in the accumulator 21 decreases below a predetermined minimum charge pressure, the force $P_aA_4$ decreases so that the forces acting to the left on the spool 319 (the left side of the above equation) exceed the forces acting to the right on the spool 319 (the right side of the above equation). This causes the spool 319 to move to the left so that the valve head portion 320 engages its associated valve seat to close the first passage 308. This imposes a restriction in the flow of fluid from the inlet port 302 and loads the pump 11 in a manner described above with particular reference to the flow divider 13 to increase the output pressure of the pump 11 until the pressure in the inlet port 302 exceeds the pressure in the accumulator 21 and the accumulator outlet port 304. This causes the fluid in the inlet port 302 to flow through the second passage 328, unseat the check valve 329, and flow to the accumulator outlet port 304 to recharge the accumulator 21.

If, during the charging of the accumulator 21, the steering valve 20 is moved from its neutral position to impose a restriction between the steering valve outlet port 303 and the drain line 28, the small amount of fluid flowing through the bleed passage 324 will cause the pressure in the steering valve 20 to increase. This increased pressure in the steering valve 20 increases the pressure in the steering valve outlet port 303, and this increased pressure $P_s$ acts on the area $A_2$ so that the force $P_sA_2$ is increased and the forces acting to the right on the spool 319 (the right side of the above equation) exceeds the forces acting to the left on the spool 319 (the left side of the above equation) so that the spool 319 moves to the right to open the first passage 308. This provides the feedback signal indicated by reference numeral 24 in FIG. 1 and directs the flow of fluid from the inlet port 302 to the steering valve outlet port 303 so that flow to the steering valve 20 is always given priority over flow to the accumulator 21.

After the steering valve 20 then returns to its neutral position at the completion of the steering maneuver, the pressure in the steering valve outlet port 303 decreases so that the force $P_sA_2$ also decreases and the forces acting to the left on the spool 319 exceed the forces acting to the right on the spool 319 so that the spool 319 moves to the left to its closed position to again close the passage 308. This permits the fluid from the inlet port 302 to again unseat the check valve 329 to complete the charging of the accumulator 21.

When the pressure $P_a$ in the accumulator 21 reaches the predetermined fully charged pressure, the force $P_aA_4$ is great enough that the forces acting to the right on the spool 319 (the right side of the above equation) exceed the forces acting to the left on the spool 319 (the left side of the above equation) so that the spool 319 begins to move to the right. As soon as the valve head portion 320 begins to move away from its associated valve seat, the pressure $P_i$ in the inlet port 302 decreases. Because the area $A_3$ (the effective area exposed to inlet port pressure acting to the left on the spool 319) is greater than the area $A_1$ (the effective area acting to the right on the spool 319), the left side of the above equation is decreased more than the right side when the pressure $P_i$ is so decreased. This moves the spool 319 still farther to the left so that inlet port pressure $P_i$ decreases still more. This causes what may be described as a "cascade effect" and results in a very fast movement of the loading spool 319 to the right when the accumulator 21 is fully charged to preclude overcharging of the accumulator. The fully charged pressure of the accumulator 21 may be changed by changing the force $F_s$ of the spring 326, as may be seen by algebraically solving the above equation for the term $F_s$.

What is claimed is:

1. A motor vehicle fluid power circuit having a fluid pump, an accumulator, and a brake booster; said brake booster comprising an input rod movable toward and away from a deactuated position, a power piston slidably disposed in a bore in axially aligned relation to said input rod, said power piston and said bore defining a fluid power chamber on one side of said power piston adjacent said input rod, an output rod on the other side of said power piston, a first fluid inlet port hydraulically connected to said fluid pump for receiving fluid from said fluid pump and being in open fluid pressure communication with said fluid power chamber, a fluid outlet port, first valve means movable by said input rod for opening and at least partially closing fluid pressure communication between said first inlet port and said outlet port through said fluid power chamber, said first valve means being open when said input rod is in said deactuated position, a second fluid inlet port hydraulically connected to said accumulator for receiving fluid from said accumulator, and second valve means actuated by said input rod for opening fluid pressure communication between said second fluid inlet port and said fluid power chamber only when said first valve means is completely closed.

2. A motor vehicle fluid power circuit as defined in claim 1 including a flow divider valve and a control valve, said flow divider valve being interposed between said pump and said brake booster and between said pump and said control valve, and said flow divider valve directing a portion of the output flow from said pump to said brake booster first inlet port and another portion of the output flow from said pump to said control valve.

3. A motor vehicle fluid power circuit as defined in claim 2 wherein said flow divider valve includes a relief valve limiting the pressure of the fluid flowing from said flow divider valve to said brake booster first inlet port, and said limited pressure being less than the relief pressure of said fluid pump.

4. A motor vehicle fluid power circuit as defined in claim 3 including a steering valve, and said control valve supplies fluid from said flow divider to said accumulator and to said steering valve.

5. A motor vehicle fluid power circuit as defined in claim 1 wherein said first valve means includes a passage extending axially through said input rod establishing fluid pressure communication between said fluid power chamber and said outlet port, an annular valve seat surrounding one end of said passage, a poppet carried by said power piston and disposed at a first predetermined position in said bore, said poppet being spaced from said valve seat when said input rod is in said deactuated position, and said valve seat axially approaching said poppet to at least partially close said passage and throttle fluid flow from said first fluid inlet port to said outlet port when said input rod is axially displaced from said deactuated position.

6. A motor vehicle fluid power circuit as defined in claim 5 wherein said second valve means includes first and second cooperating valve members, a spring biasing said first valve member against said second valve member to close said second valve means when said input rod is in said deactuated position, and said input rod moving said first valve member away from said second valve member to open said second valve means only when said first valve means is completely closed.

7. In a motor vehicle fluid power circuit, a brake booster comprising an input rod, a power piston slidably disposed in a bore in axailly aligned relation to said input rod, said power piston and said bore defining a fluid power chamber on one side of said power piston adjacent said input rod, an output rod on the other side of said power piston, a first fluid inlet port in open fluid pressure communication with said fluid power chamber, a fluid outlet port, first valve means axially movable by said input rod for opening and at least partially closing fluid pressure communication between said first inlet port and said outlet port through said fluid power chamber, said first valve means being open when said input rod is deactuated, a second fluid inlet port, second valve means axially spaced from said first valve means for opening and closing fluid pressure communication between said fluid power chamber and said second inlet port, and said second valve means being closed when said input rod is deactuated and being open only when said first valve means is completely closed.

8. In a motor vehicle fluid power circuit having a fluid pump and an accumulator, a brake booster; said brake booster comprising an input rod, a power piston slidably disposed in a bore in axially aligned relation to said input rod, said power piston and said bore defining a fluid power chamber on one side of said power piston adjacent said input rod, an output rod on the other side of said power piston, a first fluid inlet port for receiving fluid from said fluid pump and being in open fluid pressure communication with said fluid power chamber, a fluid outlet port, a passage extending axially through said input rod establishing fluid pressure communication between said fluid power chamber and said outlet port, an annular valve seat means surrounding one end of said passage, a poppet disposed at a first predetermined position in said bore and spaced from said valve seat when said input rod is in a deactuated position, said valve seat means axially approaching said poppet to at least partially close said passage and throttle fluid flow from said fluid power chamber to said outlet port when said input rod is axially displaced from said deactuated position, a second fluid inlet port for receiving fluid from said accumulator, valve means including a valve member movable by said input rod from a closed position to an open position for establishing throttled fluid pressure communication between said second inlet port and said fluid power chamber when said passage is completely closed by said engagement of said poppet and said valve seat, and said valve member being disposed at a second predetermined position in said bore when said input rod is in said deactuated position.

9. A brake booster in accordance with claim 8 wherein said poppet and said valve member are carried by said power piston, and said poppet and said valve member are mounted for axially sliding movement relative to said power piston.

10. A brake booster in accordance with claim 9 including spring means biasing said poppet to said first predetermined position in said bore and biasing said valve member to said second predetermined position in said bore when said input rod is in said deactuated position.

11. A motor vehicle fluid power circuit having a fluid pump and a brake booster; said brake booster comprising an input rod, a power piston slidably disposed in a bore in axially aligned relation to said input rod, said power piston and said bore defining a fluid power chamber on one side of said power piston adjacent said input rod, an output rod on the other side of said power piston, a fluid inlet port hydraulically connected to said fluid pump for receiving fluid from said fluid pump and being in open fluid pressure communication with said fluid power chamber, a fluid outlet port, a passage extending axially through said input rod establishing fluid pressure communication between said fluid power chamber and said outlet port, an annular valve seat means surrounding one end of said passage, a poppet disposed at a predetermined position in said bore and spaced from said valve seat when said input rod is in a deactuated position, said valve seat means axially approaching said poppet to at least partially close said passage and throttle fluid flow from said fluid inlet port through said fluid power chamber to said outlet port to increase the fluid pressure in said fluid power chamber when said input rod is axially displaced from said deactuated position.

12. A motor vehicle fluid power circuit as defined in claim 11 including a flow divider valve and a control valve, said flow divider valve being interposed between said pump and said brake booster inlet port and between said pump and said control valve, and said flow divider valve directing a portion of the output flow from said pump to said brake booster inlet port and another portion of the output flow from said pump to said control valve.

13. A motor vehicle fluid power circuit as defined in claim 11 including a flow divider valve and a steering valve, said flow divider valve being interposed between said pump and said brake booster inlet port and between said pump and said steering valve, said flow divider valve directing a portion of the output flow from said pump to said brake booster inlet port and another portion of the output flow from said pump to said steering valve, a first relief valve limiting the output pressure of said pump to a first predetermined pressure, a second relief valve limiting the pressure of said portion of said fluid directed to said brake booster inlet port to a second predetermined pressure, and said second predetermined pressure being less than said first predetermined pressure.

14. A motor vehicle fluid power circuit as defined in claim 11 including an accumulator; and said brake booster including a second fluid inlet port for receiving fluid from said accumulator, and valve means including a valve member movable by said input rod from a closed position to an open position for establishing throttled fluid pressure communication between said second inlet port and said fluid power chamber only when said passage is completely closed by said engagement of said poppet and said valve seat.

15. In a motor vehicle fluid power circuit having a fluid pump, a steering gear, a brake booster, and an accumulator, a control valve; said control valve including a housing having an inlet port for receiving fluid from said fluid pump, a first outlet port for supplying fluid to said steering gear, a second outlet port for supplying fluid to said accumulator, a first passage hydraulically connecting said inlet port to said first outlet port, a second passage hydraulically connecting said inlet port to said second outlet port, a first spool movable between an open position for opening said first passage and a closed position for closing said first passage, a spring biasing said first spool to said closed position, a second spool slidably disposed in a bore for movement between a rest position and an actuated position, said second spool including a first portion exposed to fluid inlet port pressure and a second portion of greater lateral cross-sectional area than said first portion exposed to accumulator pressure, said second spool being movable in said bore from said rest position to said actuated position by application to said first and second portions of a predetermined pressure in said inlet port and said accumulator to engage said first spool and move said first spool against the bias of said spring from said closed position to said open position, and said first spool including a net effective lateral cross-sectional area means exposed to pressure in said first outlet port when said first spool is in said closed position for moving said first spool against the bias of said spring from said closed position to said open position when said second spool is in said rest position.

16. A control valve in accordance with claim 15 wherein said first spool includes a first end portion exposed to atmospheric pressure under all conditions and a second end portion exposed to inlet port pressure when said first spool is in said closed position, and said net effective lateral cross-sectional area is equal to the difference between the area of first end portion and the area of said second end portion.

17. A control valve in accordance with claim 15 including a one-way check valve in said second passage for blocking fluid flow in a direction from said second outlet port to said inlet port.

18. A control valve in accordance with claim 15 including a bleed passage between said inlet port and said first outlet port for maintaining a small flow of fluid from said inlet port to said first outlet port under all conditions.

19. In a motor vehicle fluid power circuit having a fluid pump, a steering gear, a brake booster, and an accumulator, a control valve; said control valve including a housing having an inlet port for receiving fluid from said fluid pump, a first outlet port for supplying fluid to said steering gear, a second outlet port for supplying fluid to said accumulator, a first passage hydraulically connecting said inlet port to said first outlet port, a second passage hydraulically connecting said inlet port to said second outlet port, a valve seat in said first passage intermediate said inlet port and said first outlet port, a poppet axially movable between an open position axially spaced from said valve seat and a closed position axially engaging said valve seat for closing said first passage, a spring biasing said poppet to said closed position, a differential area piston slidably disposed in a bore for movement between a rest position and an actuated position, said differential area piston including a first end exposed to fluid inlet port pressure and a second end of greater lateral cross-sectional area than said first end exposed to accumulator pressure, said differential area piston being movable in said bore from said rest position to said actuated position by application to said first and second ends of a predetermined pressure in said inlet port and said accumulator to engage said poppet and move said poppet against the bias of said spring from said closed position to said open position, and said poppet including a net effective lateral cross-sectional area means exposed to pressure in said first outlet port when said poppet is in said closed position for moving said first spool against the bias of said spring from said closed position to said open position when said differential area piston is in said rest position.

20. In a motor vehicle fluid power circuit having a fluid pump, a steering valve, a brake booster, and an accumulator, a control valve; said control valve including a housing having an inlet port for receiving fluid from said fluid pump, a first outlet port for supplying fluid to said steering valve, a second outlet port for supplying fluid to said accumulator, a first passage hydraulically connected said inlet port to said first outlet port, a second passage hydraulically connecting said inlet port to said second outlet port, a spool movable in said housing between an open position for opening said first passage and a closed position for closing said first passage, said spool having opposite end portions, a spring biasing said spool to said closed position, a predetermined area of said first end of said spool being exposed to fluid pressure in said inlet port, a passage extending from said first end of said spool axially through said spool to said second end of said spool, a predetermined area of said second end of said spool being in open fluid pressure communication to the fluid pressure in said inlet port through said axial passage, and said predetermined area of said second end of said spool being greater than said predetermined area of said first end of said spool whereby the net force of said spool urging said spool to said closed position is decreased when the fluid pressure in said inlet port is decreased.

21. A control valve as set forth in claim 20 wherein said spool includes a first differential area portion exposed to the fluid pressure of said first outlet port and a second differential area portion exposed to the fluid pressure of said second outlet port, and said first and second differential area portions are disposed between said first and second end portions of said spool.

22. A control valve as set forth in claim 21 wherein said control valve includes a valve seat in said first passage and a valve head on said one end portion of said spool, and said valve seat and said valve head cooperate to open and close said first passage.

23. A control valve as set forth in claim 22 wherein said spool includes a smaller diameter portion and a larger diameter portion, the area difference between said valve head and said smaller diamter portion is said differential area portion, and the area difference between said smaller diameter portion and said larger diameter portion is said second differential area portion.

24. A control valve as set forth in claim 23 wherein said second passage includes a one-way check valve between said inlet port and said second outlet port.

25. A control valve as set forth in claim 20 including a bleed passage in said spool extending radially outward from said axial passage and establishing throttled fluid pressure communication between said inlet port and said first outlet port when said first passage is closed.

* * * * *

UNITED STATES PATENT OFFICE
CERTIFICATE OF CORRECTION

Patent No. 3,841,095                    Dated October 15, 1974

Inventor(s) James P. Baker

It is certified that error appears in the above-identified patent and that said Letters Patent are hereby corrected as shown below:

Column 4, line 65 "thee" should be --the--.

Column 12, line 40 "234" should be --224--.

Column 15, line 12 "diamter" should be --diameter--.

Column 22, line 17 after the word "force", "of" should be --on--.

Column 22, line 36 before the word "differential" insert the word --first--.

Signed and sealed this 7th day of January 1975.

(SEAL)
Attest:

McCOY M. GIBSON JR.          C. MARSHALL DANN
Attesting Officer            Commissioner of Patents